United States Patent
Clarke (10) Patent No.: US 9,034,405 B2
(45) Date of Patent: *May 19, 2015

(54) COMBINATIONS OF ATMOSPHERE CONTROL MEMBERS

(75) Inventor: Raymond Clarke, Los Altos, CA (US)

(73) Assignee: Apio, Inc., Guadalupe, CA (US)

( * ) Notice: Subject to any disclaimer, the term of this patent is extended or adjusted under 35 U.S.C. 154(b) by 1725 days.

This patent is subject to a terminal disclaimer.

(21) Appl. No.: 11/989,513

(22) PCT Filed: Jul. 28, 2006

(86) PCT No.: PCT/US2006/029594
§ 371 (c)(1),
(2), (4) Date: Jan. 25, 2008

(87) PCT Pub. No.: WO2007/016427
PCT Pub. Date: Feb. 8, 2007

(65) Prior Publication Data
US 2009/0104317 A1    Apr. 23, 2009

Related U.S. Application Data

(60) Provisional application No. 60/703,545, filed on Jul. 28, 2005.

(51) Int. Cl.
*A23L 3/3418* (2006.01)
*B65D 81/20* (2006.01)
(Continued)

(52) U.S. Cl.
CPC .......... *B65D 81/2069* (2013.01); *B65D 88/745* (2013.01); *A23B 7/148* (2013.01); *A23B 7/152* (2013.01)

(58) Field of Classification Search
CPC ...... A23B 7/148; A23B 7/152; B65B 25/041; B65D 81/2069; B65D 81/2076; B65D 88/745; B65D 2588/746

USPC .......... 435/297.1, 297.2, 297.5, 303.1, 303.2, 435/308.1, 809; 426/118, 395, 418; 99/467, 99/473, 474, 475
See application file for complete search history.

(56) References Cited

U.S. PATENT DOCUMENTS 3,360,380 A    12/1967    Karakian
3,369,343 A     2/1968    Robb
(Continued)

FOREIGN PATENT DOCUMENTS

AU    661 268 B2    7/1995
CN    1137349 A    12/1996
(Continued)

OTHER PUBLICATIONS

Marcellin. "Storage of Fruits and Vegetables in Controlled Atmospheres Using Polymer Membranes." Revue Generale du Froid, No. 3 (Mar. 1974), pp. 217-236.*

(Continued)

*Primary Examiner* — William H Beisner
(74) *Attorney, Agent, or Firm* — T. Richardson; J. McDonald (57) ABSTRACT

Combinations of atmosphere control members are used to control the atmosphere within a sealed container which contains a respiring biological material. The combination makes use of a first ACM having a first R ratio (the ratio of carbon dioxide permeability to oxygen permeability) and a second ACM having a second R ratio, the first R ratio being substantially greater than 1.0, and the second R ratio being less than the first R ratio. This combination (31, 321, 322, 331, 332) can form part of the sealed container (1) itself, or can be part of an assembly (31, 32, 34) through which the packaging atmosphere within the sealed container (1) is circulated.

19 Claims, 3 Drawing Sheets

(51) Int. Cl.
*A23B 7/148* (2006.01)
*A23B 7/152* (2006.01)
*B65D 88/74* (2006.01)

(56) References Cited

U.S. PATENT DOCUMENTS

| | | | |
|---|---|---|---|
| 3,450,542 A | 6/1969 | Badran | |
| 3,450,544 A | 6/1969 | Wilson et al. | |
| 3,630,759 A | 12/1971 | Rumberger | |
| 3,798,333 A | 3/1974 | Cummin et al. | |
| 3,924,010 A | 12/1975 | Erb et al. | |
| RE28,995 E | 10/1976 | Burg | |
| 4,003,728 A | 1/1977 | Rath | |
| 4,685,939 A | 8/1987 | Kratz | |
| 4,734,324 A | 3/1988 | Hill | |
| 4,779,524 A | 10/1988 | Wade | |
| 4,830,863 A | 5/1989 | Jones | |
| 4,842,875 A | 6/1989 | Anderson | |
| 4,863,492 A | 9/1989 | Doshi et al. | |
| 4,867,766 A | 9/1989 | Campbell et al. | |
| 4,879,078 A | 11/1989 | Antoon | |
| 4,896,514 A | 1/1990 | Sugiyama | |
| 4,910,032 A | 3/1990 | Antoon, Jr. | |
| 4,923,703 A | 5/1990 | Antoon | |
| 4,949,847 A | 8/1990 | Nagata | |
| 4,963,165 A | 10/1990 | Blume | |
| 4,987,745 A | 1/1991 | Harris | |
| 5,041,290 A | 8/1991 | Gindrat | |
| 5,045,331 A | 9/1991 | Antoon | |
| 5,082,471 A | 1/1992 | Athayde et al. | |
| 5,120,329 A | 6/1992 | Sauer et al. | |
| 5,158,584 A | 10/1992 | Tamura | |
| 5,160,768 A | 11/1992 | Antoon, Jr. | |
| 5,183,571 A | 2/1993 | Hanel et al. | |
| 5,254,354 A | 10/1993 | Stewart | |
| 5,333,394 A | 8/1994 | Herdeman et al. | |
| 5,342,637 A | 8/1994 | Kusters et al. | |
| 5,355,781 A | 10/1994 | Liston et al. | |
| 5,433,335 A | 7/1995 | Raudalus et al. | |
| 5,437,837 A | 8/1995 | Olson et al. | |
| 5,460,841 A | 10/1995 | Herdeman | |
| 5,623,105 A | 4/1997 | Liston et al. | |
| 5,658,607 A | 8/1997 | Herdeman | |
| 5,676,736 A | 10/1997 | Crozel | |
| 5,791,150 A | 8/1998 | Bosher et al. | |
| 5,791,236 A | 8/1998 | Schouten | |
| 5,801,317 A | 9/1998 | Liston et al. | |
| 5,807,630 A | 9/1998 | Christie et al. | |
| 5,832,699 A | 11/1998 | Zobel | |
| 5,872,721 A | 2/1999 | Huston et al. | |
| 5,876,486 A | 3/1999 | Steinwandel et al. | |
| 5,890,366 A | 4/1999 | Yang | |
| 5,900,129 A | 5/1999 | Tsuji et al. | |
| 5,960,708 A | 10/1999 | DeTemple et al. | |
| 6,007,603 A | 12/1999 | Garrett | |
| 6,013,293 A * | 1/2000 | De Moor | 426/106 |
| 6,092,430 A | 7/2000 | Liston et al. | |
| 6,093,238 A | 7/2000 | Huf | |
| 6,190,436 B1 | 2/2001 | Ji et al. | |
| 6,190,710 B1 | 2/2001 | Nir et al. | |
| 6,210,724 B1 | 4/2001 | Clarke et al. | |
| 6,256,905 B1 * | 7/2001 | White | 34/467 |
| 6,296,923 B1 | 10/2001 | Zobel | |
| 6,376,032 B1 | 4/2002 | Clarke et al. | |
| 6,410,465 B1 | 6/2002 | Lim | |
| 6,427,484 B1 | 8/2002 | Choi et al. | |
| 6,456,943 B1 | 9/2002 | Kogure | |
| 6,468,328 B2 | 10/2002 | Sircar | |
| 6,548,132 B1 | 4/2003 | Clarke | |
| 6,579,607 B1 | 6/2003 | Gozukara et al. | |
| 6,582,498 B1 | 6/2003 | Sass et al. | |
| 6,615,908 B1 | 9/2003 | Bosher | |
| 6,709,483 B1 | 3/2004 | Hodgson, Jr. | |
| 6,840,982 B2 | 1/2005 | Kunstadt | |
| 7,329,452 B2 | 2/2008 | Clarke et al. | |
| 7,396,383 B2 | 7/2008 | Burban et al. | |
| 7,601,202 B2 | 10/2009 | Noack et al. | |
| 7,601,374 B2 | 10/2009 | Clarke | |
| 7,866,258 B2 | 1/2011 | Jorgensen et al. | |
| 2002/0090425 A1 | 7/2002 | Clarke | |
| 2002/0127305 A1 | 9/2002 | Clarke | |
| 2003/0057217 A1 | 3/2003 | Wyslotsky | |
| 2003/0061938 A1 | 4/2003 | Kunstadt | |
| 2003/0154857 A1 | 8/2003 | Murdoch | |
| 2004/0131810 A1 | 7/2004 | Clarke et al. | |
| 2005/0284814 A1 | 12/2005 | Mairal | |
| 2006/0162577 A1 | 7/2006 | Jorgensen | |
| 2007/0065546 A1 | 3/2007 | Jorgensen | |
| 2007/0144638 A1 * | 6/2007 | Fernandez et al. | 149/115 |
| 2007/0259082 A1 | 11/2007 | Clarke | |
| 2008/0173179 A1 | 7/2008 | Tandon | |
| 2008/0202262 A1 | 8/2008 | Schmidt | |

FOREIGN PATENT DOCUMENTS

| | | |
|---|---|---|
| CN | 1238445 A | 12/1999 |
| DE | 3842930 A1 | 6/1990 |
| DE | 19518407 A1 | 11/1996 |
| DE | 19545764 A1 | 6/1997 |
| DE | 19849216 A1 | 4/2000 |
| DE | 19951732 A1 | 5/2001 |
| DE | 10051910 A1 | 5/2002 |
| DE | 10233182 A1 | 7/2003 |
| EP | 0351115 A2 | 1/1990 |
| EP | 0351116 A2 | 1/1990 |
| EP | 0551158 A1 | 7/1993 |
| EP | 0611037 A1 | 8/1994 |
| EP | 0 690 012 A1 | 1/1996 |
| EP | 0767139 B1 | 4/1997 |
| EP | 0888804 A2 | 1/1999 |
| EP | 0997164 A2 | 5/2000 |
| FR | 2531042 A2 | 2/1984 |
| GB | 820699 | 9/1959 |
| GB | 874277 | 8/1961 |
| GB | 2 246 107 A | 1/1992 |
| JP | 55124449 | 9/1980 |
| JP | 60118605 A | 6/1985 |
| JP | 6187727 A | 5/1986 |
| JP | 63062537 A | 3/1988 |
| JP | 63062537 B | 12/1988 |
| JP | 01264905 A | 10/1989 |
| JP | H1-273515 A | 11/1989 |
| JP | 2221102 A | 9/1990 |
| JP | 3061198 A | 3/1991 |
| JP | 3187367 A | 8/1991 |
| JP | 6234505 A | 8/1994 |
| JP | 08-173025 A | 7/1996 |
| JP | 9206046 A | 8/1997 |
| RU | 2235254 C2 | 8/2004 |
| WF | WO 0004787 A1 | 2/2000 |
| WO | WO 9412040 A1 | 6/1994 |
| WO | WO 9522729 A1 | 8/1995 |
| WO | WO 9638495 A1 | 12/1996 |
| WO | WO 0192118 A2 | 12/2001 |
| WO | WO 03043447 A1 | 5/2003 |
| WO | WO 2004107868 A1 | 12/2004 |
| WO | 2005074466 A2 | 8/2005 |

OTHER PUBLICATIONS

Supplementary European Search Report, Application No. EP 06 78 8895, Apr. 5, 2010.

PCT, International Preliminary Report on Patentability, Jan. 29, 2008.

Marcellin, P., "Storage of Fruits and Vegetables in Controlled Atmosphere Using Polymer Membranes," Revue Generale du Froid No. 3, Mar. 1974, pp. 217-236.

* cited by examiner

COMBINATIONS OF ATMOSPHERE CONTROL MEMBERS

CROSS-REFERENCE TO RELATED APPLICATIONS

This application is an application under 35 USC 371 based on PCT/US06/29549, filed Jul. 28, 2006, which claims the priority of U.S. Provisional application 60/703,545, filed Jul. 28, 2005. This application is related to U.S. Provisional Application No. 60/540,121, filed Jan. 28, 2004, U.S. Provisional Application No. 60/539,949, filed Jan. 28, 2004, and International Application No. PCT/U.S. Ser. No. 04/042,018, which was published as WO 05/07 4466. The entire disclosure of each of those applications is incorporated by reference herein for all purposes.

BACKGROUND OF THE INVENTION

This invention relates to the packaging of respiring biological materials, and other situations in which control of the gases in an atmosphere is desirable.

Respiring biological materials, e.g. fruits and vegetables, consume oxygen ($O_2$) and produce carbon dioxide ($CO_2$) at rates which depend upon the stage of their development, the atmosphere surrounding them and the temperature. In modified atmosphere packaging (MAP), the objective is to produce a desired packaging atmosphere around respiring materials by placing them in a sealed container whose permeability to $O_2$ and $CO_2$ produces the desired packaging atmosphere. Often, the container includes at least one atmosphere control member (abbreviated herein to ACM), this term being used herein to denote any component which modifies the rates at which oxygen and carbon dioxide pass into and out of the sealed container. In some cases, the ACM has an oxygen transmission rate (OTR) and a carbon dioxide transmission rate (COTR) such that the ratio of COTR to OTR (referred to herein as R ratio) is greater than 1. In some cases, the container includes a pinhole to ensure equalization of the pressure within and outside the sealed package. In controlled atmosphere packaging (CAP), the objective is to produce a desired packaging atmosphere by displacing some or all of the air within a sealed container by one or more gases, e.g. nitrogen, $O_2$, $CO_2$ and ethylene, in desired proportions.

For further details of MAP, ACMs and CAP, reference may be made, for example, to U.S. Pat. No. 3,360,380 (Bedrosian), U.S. Pat. No. 3,450,542 (Badran), U.S. Pat. No. 3,450,544 (Badran et al.), U.S. Pat. No. 3,798,333 (Cummin et al), U.S. Pat. No. 3,924,010 (Erb), U.S. Pat. No. 4,003,728 (Rath), U.S. Pat. No. 4,734,324 (Hill), U.S. Pat. No. 4,779,524 (Wade), U.S. Pat. No. 4,830,863 (Jones), U.S. Pat. No. 4,842,875 (Anderson), U.S. Pat. No. 4,886,372 (Greengrass), U.S. Pat. No. 4,879,078 (Antoon), U.S. Pat. No. 4,910,032 (Antoon), U.S. Pat. No. 4,923,703 (Antoon), U.S. Pat. No. 4,987,745 (Harris), U.S. Pat. No. 5,041,290 (Wallace et al.) U.S. Pat. No. 5,045,331 (Antoon), U.S. Pat. No. 5,063,753 (Woodruff), U.S. Pat. No. 5,160,768 (Antoon), U.S. Pat. No. 5,254,354 (Stewart), U.S. Pat. No. 5,333,394 (Herdeman), U.S. Pat. No. 5,433,335 (Raudalus et al.), U.S. Pat. No. 5,443,851 (Christie et al.), U.S. Pat. No. 5,460,841 (Herdeman), U.S. Pat. No. 5,556,658 (Raudalus et al.), U.S. Pat. No. 5,658,607 (Herdeman), U.S. Pat. No. 5,807,630 (Christie et al.), U.S. Pat. No. 5,832,699 (Zobel), U.S. Pat. No. 5,872,721 (Huston et al.), U.S. Pat. No. 6,013,293 (De Moor), U.S. Pat. Nos. 6,190,710, 6,210,724 (Clarke et al.), U.S. Pat. No. 6,296,923 (Zobel), U.S. Pat. No. 6,376,032 (Clarke et al.) and U.S. Pat. No. 6,548,132 (Clarke et al.); copending commonly assigned U.S. patent application Ser. No. 09/580,379 (Clarke), Ser. No. 09/999,600 (Clarke), 60/435,567 (Clarke et al.) and 60/532,025 (Clarke); US Patent Application Publication Nos. US 2002/0090425, US 2002/0127305 (Clarke) and 2003/0057217 (Wyslotsky); International Publication Nos. WO 94/12040 (Fresh Western), WO 96/38495 (Landec), WO 00/04787 (Landec), WO 01/92118 (Landec), WO 03/043447 (Landec) and WO 05/074466 (Landec); and European Patent Applications Nos. 0,351,115 and 0,351,116 (Courtaulds). The disclosure of each of those patents, applications and publications is incorporated herein by reference for all purposes.

SUMMARY OF THE INVENTION

It has been discovered, in accordance with the present invention, that valuable results can be obtained by making use of a combination of ACMs to control the atmosphere within a sealed container which benefits from such control, particularly a sealed container which contains a respiring biological material. Thus, the present invention, in its various aspects, makes use of a first ACM having a first R ratio and a second ACM having a second R ratio, the first R ratio being substantially greater than 1.0, e.g. at least 1.5 or at least 2.0, or at least 3.0, e.g. 1.5 to 5.0, or 2.0 to 4.0, or 2.3 to 3.0; and the second R ratio being substantially less than the first R ratio, for example 1.0 to 2.3 or 1.3 to 2.0, in some cases, about 1.0. The R ratio of the second ACM can be at least 2 units lower than, e.g. at least 3 units lower than or at least 4 units lower than, the R ratio of the ACM.

The invention is chiefly described herein by reference to the use of a single first ACM and a single second ACM, but the invention includes the possibility that there is more than one first ACM and/or more than one second ACM.

In some embodiments of the invention, the first and second ACMs form part of the exterior walls of the sealed container, so that the packaging atmosphere continuously contacts the first and second ACMs simultaneously. In some other embodiments, one or both of the first and second ACMs forms part of an assembly which is within or adjacent to the sealed container. Such an assembly can be permanently attached to the container or can be separable from the sealed container, for example before the container is sealed and/or after the container has been sealed and/or after the container has been unsealed and optionally the contents removed. For example, at some desired time, for example when a shipping container is in place in a ship or on a road vehicle, or after a shipping container has been removed from a ship or a vehicle and before it is placed on another ship or another vehicle, or just before a shipping container is unpacked, the shipping container can be connected to an assembly comprising the first and second ACMs, and the packaging atmosphere within the shipping container circulated from the sealed container, through a chamber which comprises the first and second ACMs, or sequentially through two chambers, one containing the first ACM and the other containing the second ACM (in either order), and back into the container.

The surrounding atmosphere on the exterior sides of the ACMs (i.e. the sides which are not contacted by the packaging atmosphere) can be air or any other atmosphere which interacts, through the ACM, with the packaging atmosphere to produce a desired result. For example, ethylene or other ripening agent can be introduced into the packaging atmosphere in this way. The atmosphere on the exterior side of the first ACM can be the same as or different from the atmosphere on the exterior side of the second ACM. The effect on the packaging atmosphere can be changed by changing the speed and/or the pressure of the packaging atmosphere as it contacts the ACMs, and/or by changing the speed and/or the pressure of the surrounding atmosphere.

In some embodiments, an advantage provided by the present invention is that the first and second ACMs together provide the container with a desired R ratio which cannot be provided by, or cannot easily be provided by, a single ACM. In other embodiments, the presence of the second ACM provides what is in effect a controlled leak which helps to equalize the pressure inside the container with the pressure of the surrounding atmosphere; particularly is this so when the second ACM has a R ratio of about 1.0.

In a first preferred aspect, this invention provides a method of controlling the atmosphere within a sealed container, the method comprising the steps of
  (A) providing a sealed container which contains (i) a respiring biological material, and (ii) a packaging atmosphere surrounding the biological material;
  (B) contacting the packaging atmosphere with a first ACM which comprises a first interior face which is contacted by the packaging atmosphere and a first exterior face which is exposed to a first exterior atmosphere;
  (C) contacting the packaging atmosphere with a second ACM which comprises a second interior face which is contacted by the packaging atmosphere and a second exterior face which is exposed to a second exterior atmosphere;
the first ACM having a first R ratio and the second ACM having a second R ratio, the first R ratio being substantially greater than 1.0, and the second R ratio being substantially less than the first R ratio.

In a second preferred aspect, this invention provides a gas-treating assembly which comprises
  (1) a chamber which defines an enclosed volume and which has an interior surface and an exterior surface;
  (2) a first ACM having a first interior face which is part of the interior surface of the chamber and a first exterior face which is part of the exterior surface of the chamber;
  (3) a second ACM having a second interior face which is part of the interior surface of the chamber and a second exterior face which is part of the exterior surface of the chamber;
  (4) an entry port; and
  (5) an exit port;
the first ACM having a first R ratio and the second ACM having a second R ratio, the first R ratio being substantially greater than 1.0, and the second R ratio being substantially less than the first R ratio; and
the entry port and the exit port being positioned so that if a gas is caused to flow from the entry port to the exit port, the gas contacts the interior surface of the first ACM and the interior surface of the second ACM.

The chamber can be divided into two parts, optionally separated by a pipe or other connecting member, one part comprising the first ACM and the other part comprising the second ACM, so that gas flowing from the entry port to the exit port contacts the first and second ACMs sequentially or in either order.

In a third preferred aspect, this invention provides a container which can be sealed, or has been sealed, around a respiring biological material, and which comprises, or is connected to, or can be connected to, an assembly according to the second preferred aspect of the invention.

In a fourth preferred aspect, this invention provides a container which can be sealed around a respiring biological material, or which has been, sealed around a respiring biological material and which comprises a first ACM having a first R ratio and the second ACM having a second R ratio, the first R ratio being substantially greater than 1.0, and the second R ratio being substantially less than the first R ratio.

In a fifth preferred aspect, this invention provides a method of storing (including ripening) a respiring biological material in which the packaging atmosphere around the biological material is controlled, continuously or intermittently, by a first ACM and a second ACM, the first ACM having a first R ratio and the second ACM having a second R ratio, the first R ratio being substantially greater than 1.0, and the second R ratio being substantially less than the first R ratio. In one embodiment of the fifth preferred aspect of the invention, the packaging atmosphere is passed through a gas treating assembly according to the second preferred aspect of the invention, the packaging atmosphere contacting the interior faces of the first ACM and the second ACMs. In another embodiment of the fifth preferred aspect of the invention, the packaging atmosphere contact the exterior surfaces of the first and second ACMs, and air or another preferred atmosphere is passed through the gas treating assembly in contact with the interior surfaces of the first and second ACMs.

In a sixth preferred aspect, this invention apparatus for controlling the atmosphere within a package containing a respiring biological material, the apparatus including a first ACM and a second ACM, the first ACM having a first R ratio and the second ACM having a second R ratio, the first R ratio being substantially greater than 1.0, and the second R ratio being substantially less than the first R ratio.

BRIEF DESCRIPTION OF THE DRAWING

The invention is illustrated in the accompanying drawings, which are diagrammatic and not to scale, and in which.

DETAILED DESCRIPTION OF THE INVENTION

In the Summary of the Invention above and in the Detailed Description of the Invention below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in combination with and/or in the context of other particular aspects and embodiments of the invention, and in the invention generally.

The term "comprises" and grammatical equivalents thereof are used herein to mean that other elements (i.e. components, ingredients, steps etc.) are optionally present. For example, a structure "comprising" (or "which comprises") components A, B and C can contain only components A, B and C, or can contain not only components A, B and C but also one or more other components.

The terms "a", "an" and "the" before an item are used herein to mean that there can be a single such item or two or more such items, unless the context makes this impossible. For example, where reference is made to a container including an ACM, this includes the possibility that the container includes one ACM or a plurality of ACMs; similarly where reference is made to a module having a wall comprising an ACM, this includes the possibility that there are two or more such walls, and that each such wall comprises one or more ACMs. The term "consisting essentially of" and grammatical equivalents thereof is used herein to mean that other elements may be present which do not materially alter the disclosed invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 2 to 16 m$^3$" or "2-16 m$^3$" means a range whose lower limit is 2 m$^3$ and whose upper limit is 16 m$^3$. The numbers given herein should be construed with the latitude appropriate to their context and expression. The term "plurality" is used herein to mean two or more.

In describing and claiming the invention below, the following abbreviations, definitions, and methods of measurement (in addition to those already given) are used.

OTR and COTR values are given in ml/m$^2$.atm.24 hr, with the equivalent in cc/100 inch$^2$.atm.24 hrs in parentheses, and can be measured using a permeability cell (supplied by Millipore) in which a mixture of $O_2$, $CO_2$ and helium is applied to the sample, using a pressure of 0.035 kg/cm$^2$ (0.5 psi), and the gases passing through the sample are analyzed for $O_2$ and $CO_2$ by a gas chromatograph. The cell could be placed in a water bath to control the temperature. The abbreviation $P_{10}$ is used to mean the ratio of the permeability, to $O_2$ or $CO_2$ as specified, at a first temperature $T_1°$ C. to the permeability at a second temperature $T_2$, where $T_2$ is $(T_1-10)°$ C. $T_1$ being 10° C. and $T_2$ being 0° C. unless otherwise noted. The abbreviation R or R ratio is used to mean the ratio of COTR to OTR, both permeabilities being measured at 20° C. unless otherwise noted. Pore sizes are measured by mercury porosimetry. Parts and percentages are by weight, except for percentages of gases, which are by volume. Temperatures are in degrees Centigrade. For crystalline polymers, the abbreviation $T_o$ is used to mean the onset of melting, the abbreviation $T_p$ is used to mean the crystalline melting point, and the abbreviation ΔH is used to mean the heat of fusion. $T_o$, $T_p$ and ΔH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

Where reference is made herein to sealed packages and sealed containers, and to sealing containers containing biological materials, it is to be understood that the sealing can be, but need not be, hermetic sealing. Conventional methods for sealing containers can conveniently be used in this invention.

The first ACM and/or the second ACM can for example be placed over a window in the container, or can be an integral part of the container. A container can include two or more first ACMs, which can be the same or different, and two or more second ACMs, which can be the same or different. The ACMs are preferably such that at 22° C. at least 50%, generally at least 75%, of the oxygen entering the packaging atmosphere passes through the ACMs; and the ACMs can provide substantially the only pathways for oxygen and carbon dioxide to enter or leave the inner atmosphere. Preferably the ACMs are such that after 24 hours, the packaging atmosphere contains less than 18% oxygen, e.g. 2-15% oxygen.

An ACM can for example comprise (i) a nonwoven material, optionally having a polymer coating thereon, as described for example in U.S. Pat. No. 5,045,331 (Antoon); or (ii) a microporous film, optionally having a polymeric coating thereon, as described for example in U.S. Pat. Nos. 4,879,078, 4,842,875, 5,160,768 and 6,376,032.

The size and permeability characteristics of the ACMs are selected with reference to the type and quantity of the respiring biological material and the desired packaging atmosphere. By controlling the access of the packaging atmosphere and/or the exterior atmosphere to one or more of the ACMs, the packaging atmosphere can be maintained at a desired composition over time.

The first ACM can be, for example, the same per unit area as one of the ACMs disclosed in the documents incorporated herein by reference. In some cases, the ACM comprises a microporous film having a coating thereon of a suitable polymer, e.g. a sharply-melting crystalline polymer or a polysiloxane. The ACM preferably has an OTR of at least 775,000 (50,000), particularly at least 1,550,000 (100,000), e.g. at least 2,325,000 (150,000). For some uses, a higher OTR, e.g. at least 7,750,000 (500,000), e.g. at least 13,590,000 (900,000), is preferred. In some cases, it is preferred to use a first ACM having an R ratio of at least 1.5, particularly at least 2.5, e.g. at least 3. In some cases it is preferred that the first ACM has an oxygen $P_{10}$ ratio, over at least one 10° C. range between −5 and 15° C., of at least 1.3, e.g. at least 2.6.

The present invention can make use of ACMs which are substantially larger than ACMs used in the past. For example, at least one of the ACM and the second ACM optionally has an area greater than 0.06 m$^2$ (100 in$^2$), e.g. greater than 0.65 m$^2$ (1000 in$^2$). In some embodiments, the ACM has an area of 0.06 to 13 m$^2$ (100 to 20,000 in2), for example 0.65 to 6.5 m$^2$ (1000 to 10,000 in$^2$).

One or both of the first ACM and the second ACM can be part of a chamber to which the access of gas can be controlled. The control can be over any one or more of the variables which will affect the performance of the ACM, including the amount of gas, the type of gas and the flowrate of the gas over one or both of the faces of the ACM. The total gas pressure within, and the rate of gas flow through, the chamber can be controlled, for example, through the use of one or more devices to control access to, and/or egress from, the chamber. Such devices include, for example, compressors, pumps, valves, and other metering devices. The ingredients of one of the atmospheres, and the proportion of each ingredient, can be controlled, for example, by feeding different gases into the chamber at controlled rates. The access of gas can be controlled by reference to data received from one or more sensors within the container and/or the gas supply and/or the gas leaving the chamber. There can for example be continuous interactive control of pumps and/or valves controlling the gas supply via a feedback loop comprising one or more sensors of gas levels, e.g. oxygen and/or $CO_2$ level, in the atmosphere within the container. The control systems disclosed in U.S. Pat. No. 5,460,841 (Herdeman) and U.S. Pat. No. 5,872,721

(Huston et al.), adapted to the requirements of the present invention, can for example be used.

There can be two or more chambers, each containing an ACM. The ACMs in the different chambers can be the same or different, and the access of gas to the different chambers can be controlled in the same or different ways. In one embodiment, there are two or more chambers, one or more of the chambers containing a second ACM having a relatively low R ratio, e.g. 1 to 2.3 or 1.3 to 2.0, and one or more other chambers, each containing a first ACM having a higher R ratio, e.g. 1.5 to 5, or 2.0 to 4.0, or 2.3 to 3.0. In this embodiment, the average R ratio can be changed from time to time by changing the flow rate through the different chambers. In another embodiment, when a fixed R ratio is needed and an ACM having that R ratio is not available, two ACMs having different R ratios (and if necessary different sizes) can be part of the same chamber.

Preferably the second ACM is a microporous film, for example as described in the documents incorporated by reference, the microporous film being uncoated or coated with a polymer having a relatively low R ratio. Preferably, the apertures in the microporous film are small enough to ensure that harmful organisms cannot enter the package, e.g. have a maximum dimension less than 1μ, preferably less than 0.8μ, especially less than 0.5μ.

When the package is hermetically sealed, the second ACM preferably has an R ratio of substantially 1.0, or the package additionally contains at least one pinhole, to ensure pressure equalization. Especially when the sealing of the package is not complete (e.g. when the container is a polymeric bag whose neck is sealed with a twist tie), the second ACM can have an R ratio greater than 1, since some pressure equalization can be achieved by leakage through the incomplete seal. The OTR of the second ACM is preferably at least 1,000,000, more preferably at least 3,000,000, particularly at least 5,000,000, especially at least 8,000,000, cc/100 in.$^2$.atm.24 hr.

The size of the second ACM can optionally be such that its oxygen permeance is 0.2 to 4 times, e.g. 0.5 to 3 times or 1 to 2 times, the oxygen permeance of the first ACM. The effective size of the ACM and/or the second ACM can for example be varied in a controlled way, e.g. through the use of a retractable cover.

The first ACM and the second ACM can be part of a package whose permeability is at all times controlled by both the ACM and the second ACM. The package can for example be stored in an atmosphere which is constant, e.g. air, or whose composition varies, preferably in a controlled way, and which may be still or which may flow over the package at a fixed or variable, preferably controlled, rate. Alternatively, one or both of the first ACM and second ACM can be part of a chamber or chambers to which access of air or other gas is controlled, e.g. by valves, pumps or fans, for example by a controller according to a time schedule, or in response to one or more sensors which sense one or more of the temperature outside the package, the temperature inside the package, and the partial pressure of one or more gases, e.g. oxygen, carbon dioxide or ethylene, inside and/or outside the package. In some cases, the first ACM is part of a first chamber and the second ACM is part of the second chamber, the access of gas to the two chambers preferably being independently controlled.

In one embodiment of the invention, first and second ACMs are part of a system for controlling the atmosphere within a shipping container or the like, a cool room or a ripening room.

The invention includes a module comprising at least one ACM and at least one second ACM, preferably a module which can be reused (optionally after replacing one or both of the ACM and the second ACM), for example a module which can be placed inside or outside a shipping container.

Containers

The present invention can be used with any type of container. The walls of the container can be rigid or flexible, or some of the walls can be rigid and others flexible. The walls can be composed of any material, for example metal, wood, or a polymeric material. Some or all of the walls can be substantially impervious to one or more of $O_2$, $CO_2$, water vapor and any other gas important to the storage of the respiring biological material; or some or all of the walls can have a limited permeability to such gases.

In some embodiments, the container is relatively large, for example has a capacity of at least 1 m$^3$, for example 2-100 m$^3$. Examples of such containers are conventional shipping and transportation containers, which are generally composed of metal, have a volume of at least 40 m$^3$, typically about 43 or about 86 m$^3$, and can be loaded onto a ship or a truck. Such containers are well known to those skilled in the art of storing and transporting fruits and vegetables, and are available in a range of standard sizes. Such containers may be fitted with the piping and gas supplies needed for conventional refrigeration and/or CAP procedures, and can readily be adapted for use in the present invention. The container can also be a room in a building, e.g. a ripening room, i.e. a room in which a respiring biological material is exposed to ethylene or another gaseous ripening agent.

Temperatures During Storage

The temperature during storage of the respiring biological material will often have an effect on the respiration of the biological material and/or the permeabilities of the ACMs to at least some gases. The temperature can be substantially constant, for example a temperature used in storage under refrigeration, e.g. 2-6° C., or can be at a first level during a first storage period and at a different level, e.g. 18-22° C., during one or more other storage periods before or after that storage.

In one embodiment of the invention, at least one of the atmosphere within the package (first atmosphere) and the atmosphere outside the package (second atmosphere) flows over at least one of the first ACM and second ACM. This and other embodiments optionally have at least one the following characteristics.

(i) One of the first and second atmospheres contains p % by volume of $CO_2$, where p is at least 3, e.g. 3-15, and the other atmosphere contains less than p %, e.g. 0-5%, preferably substantially 0%, by volume of $CO_2$.

(i) One of the first and second atmospheres contains q % by volume of $O_2$, where p is at least 15, e.g. 15-25, preferably substantially 21, and the other atmosphere contains less than q %, e.g. 2-15% or 3-10%, by volume of $O_2$.

(iii) One of the atmospheres is an atmosphere within a sealed container containing a respiring biological material, e.g. (a) a packaging atmosphere in direct contact with the respiring biological material, or (b) an intermediate atmosphere in contact with the exteriors of a plurality of sealed containers, each of which includes a second ACM and contains a respiring biological material; and the other atmosphere is air or oxygen-enriched air.

(iv) The rate at which at least one of the atmospheres flows over the surface of at least one of the first ACM and second ACM is changed, discontinuously or continuously (e.g. in response to one or more sensors which measure the concentration of at least one gas in at least one of the atmospheres before and/or after one or both of the atmospheres have flowed over the ACM), the rate preferably being one or more of
- (a) the volume of the atmosphere passing through a closed chamber including the first ACM and second ACM, and
- (b) the average speed at which the atmosphere flows over the first ACM or the second ACM.

(v) The first ACM or second ACM is part of a closed chamber and one of the atmospheres is caused to flow through the chamber, and preferably the method has one or more of the following features:—
- (a) the atmosphere flows through the chamber at a rate of 5-500, e.g. 10-300 or 20-200 cfm (0.14-14, e.g. 0.28-8.4 or 0.56-5.6 m$^3$/min),
- (b) the atmosphere flows through the chamber from at least one inlet to at least one outlet, the inlet and outlet being placed so that a straight-line joining the inlet and the outlet crosses the first ACM or the second ACM, the atmosphere preferably flowing at a rate such that the average speed of the atmosphere flowing across the first ACM or the second ACM (defined as the volume of the atmosphere passing through the chamber per minute divided by the cross-section of the chamber at right angles to said straight line) is 50 to 5000, e.g. 200 to 2500, inch/min (1.25 to 125, e.g. 5 to 65, m/min),
- (c) the atmosphere flows through the chamber at a rate such that the volume of the atmosphere flowing through the chamber is 0.0025 to 0.25, e.g. 0.005 to 0.1 or 0.005 to 0.04, ft$^3$ per in$^2$ (0.06 to 6.4, e.g. 0.12 to 2.5 or 0.12 to 1.0 mm$^3$ per mm$^2$) of the first and/or second ACM exposed to said atmosphere,
- (d) the chamber is a rectangular parallelepiped which comprises two major faces and four minor faces; and in which at least one of the major faces includes a first ACM or a second ACM, a first minor face includes at least one inlet for an incoming atmosphere, and a second minor face opposite the first minor face includes at least one outlet for an outgoing atmosphere, and
- (e) the chamber comprises (i) a generally cylindrical surface which comprises the first ACM or the second ACM, and (ii) two opposite end faces, one of the end faces including at least one inlet for an incoming atmosphere and the other of the end faces including at least one outlet for an outgoing atmosphere.

In some embodiments of the invention, one or both of the first ACM and the second ACM is an internal ACM, this term being used to denote an ACM which, when gases are passing through the ACM, has
- (a) a first surface which is in direct contact with the packaging atmosphere, and
- (b) a second surface which is not in direct contact with the inner atmosphere and is not part of the exterior surface of the container.

In some embodiments of the invention, the respiring biological material is placed within the container without any additional packaging, or in packaging which does not affect the atmosphere around the biological material, e.g. in cardboard boxes or in polymeric bags or containers which are open or have large perforations. In these embodiments, the atmosphere within the container will be the same as the packaging atmosphere in direct contact with the respiring biological material. However, it is also possible for the respiring biological material, before it is placed in an outer container having an internal first ACM and/or an internal second ACM, to be packaged in one or more containers which include a conventional selective ACM, and/or a second ACM. The packaging atmosphere around the biological material will then reflect the permeability of both the outer container and the permeability of the conventional inner container(s).

Each of the first and second ACMs, can for example have one or more of the following characteristics.
- (a) It has an invariable effective size.
- (b) It is associated with means for changing, preferably reversibly changing, its effective size, for example a retractable cover.
- (c) It is connected to a means for changing, preferably reversibly changing, the rate at which the packaging atmosphere and/or the exterior atmosphere is supplied to the ACM (including means which prevents gas from being supplied at all).
- (d) It is connected to a means for changing, preferably reversibly changing, the chemical constitution of gas supplied to the second surface of the ACM.
- (e) it is supported by a support member, e.g. a metal grille, which is sufficiently permeable to gas that it has substantially no effect on the ACM except to reduce its effective area. For example, the ACM can be sandwiched between two such support members. The support members are particularly useful if there is a substantial difference between the pressures within and outside the container, in order to avoid distortion of the ACM by the pressure difference. Preferably, the pressure difference is small, e.g. less than 0.3 in. of water.

In some embodiments, the first ACM and/or the second ACM is part of an assembly comprising a chamber having (1) an inlet for gas, (2) an outlet for gas, and (3) a wall comprising the ACM. The assembly can for example be constructed separately from the container, and then put in place before, during or after placement of the respiring biological material in the container. In use, the inlet is connected by a conduit to one or more sources of gas, and the outlet is connected by a conduit to appropriate gas disposal means (in many cases, simply the atmosphere). Optionally, some or all of these conduits are part of the preassembled assembly. Any other needed conduits can be part of the container before the assembly is placed in the container, or before the assembly is placed adjacent to the container, and/or can be added after the assembly has been put in place.

The assembly can be of any shape. The shape can suitably be defined by a rigid frame, composed for example of one or more of metal, wood and polymeric materials. Often it is convenient for the assembly to be generally box-shaped, for example a box having two major faces defined by two relatively large dimensions, and four minor faces defined by one of the large dimensions and a relatively small dimension. For example, each of the large dimensions can be 0.3-12 m (1-40 ft), e.g. 2-6 m. (6-20 ft) a, and the small dimension can be 0.02-0.5 m (1-20 in.) e.g. 0.05-0.25 m (2-9 in). At least one of the faces of the assembly, for example one or both of the major faces of a box-shaped assembly, comprises an aperture which is covered by the first ACM or the second ACM.

The assembly can be attached permanently or semi-permanently to a container, in which case it is not removed from that container when the biologically respiring material is placed within, or removed from, the container. Alternatively, the assembly can be one which is removed from the container, after the container has been unsealed, and before, during or after removal of the biologically respiring material; and is later reused, by being placed within the original container or in a second container, before, during or after the biologically respiring material is placed therein. In this way, it is possible for a container, which has been used to ship goods which do not require atmosphere control, to be unloaded and then to be used, in a further journey, to ship respiring biological materials or other goods that require atmosphere control during shipping.

THE DRAWINGS

The invention is illustrated in the accompanying FIGS. 1-6. The various components which are illustrated in the Figures are identified by reference numerals as set out below.

Figure 1:
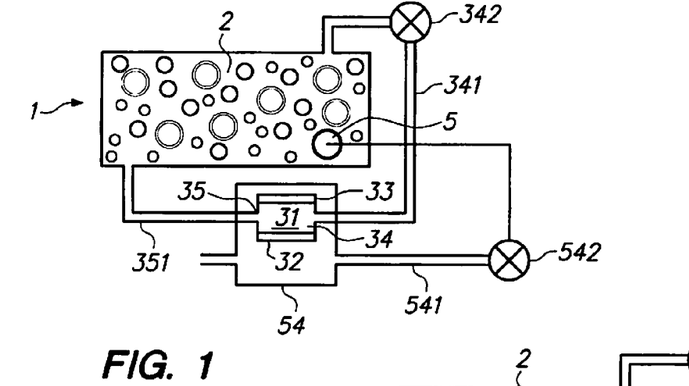
FIGS. 1-6 are plan views of shipping containers and illustrate methods and container systems of the invention.
Figure 2:
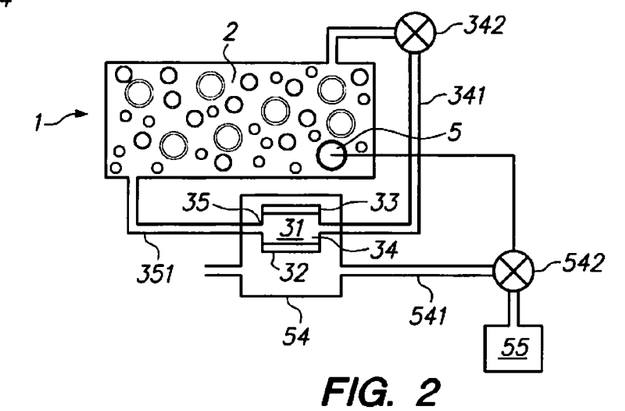
Figure 3:
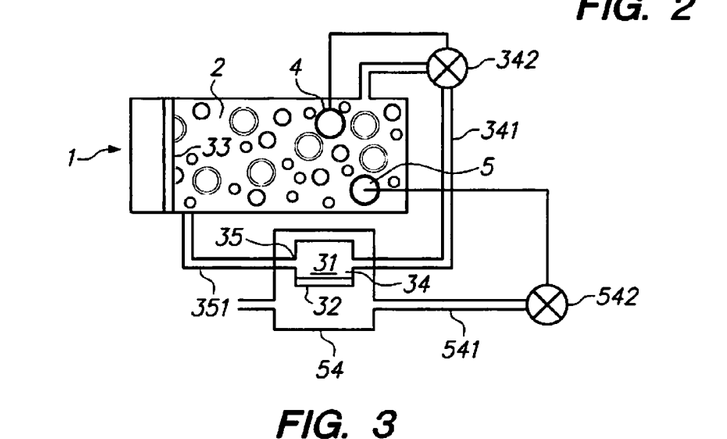
Figure 4:
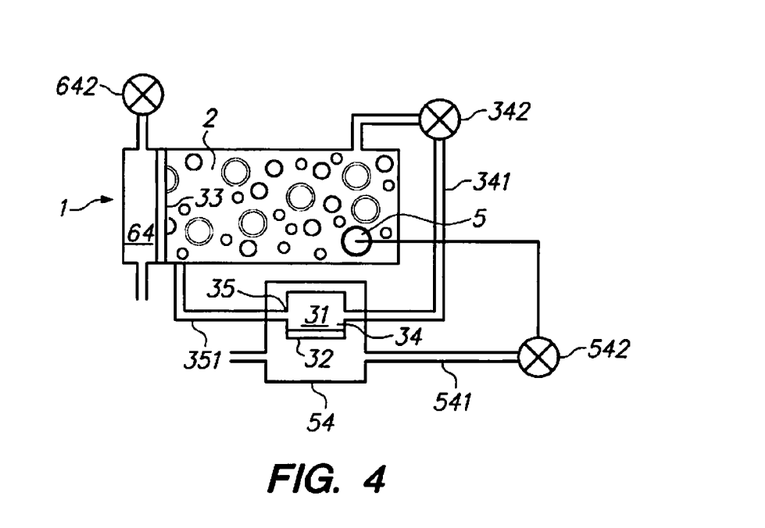
Figure 5:
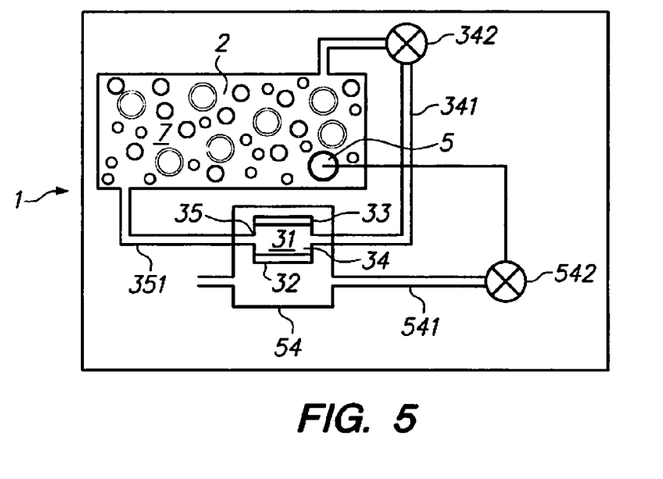
Figure 6:
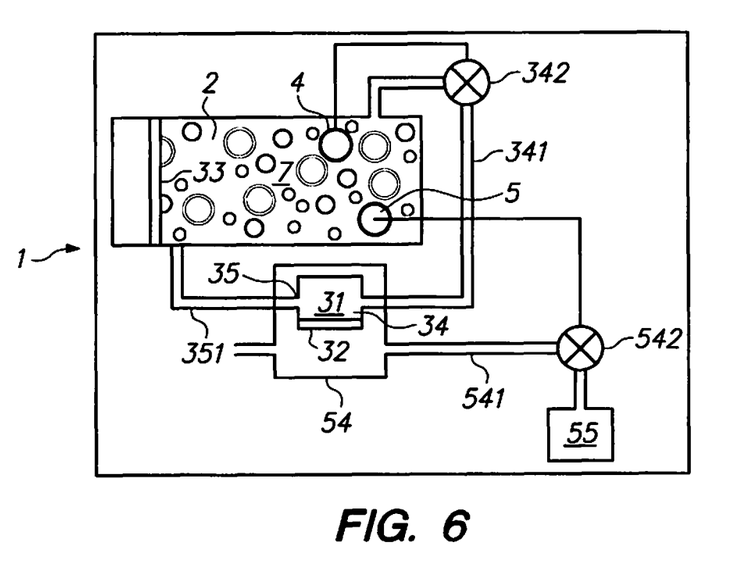

1 a shipping container 1 which contains respiring biological material sealed within the shipping container and surrounded by a packaging atmosphere, 7 a sealed container 7 which is within a shipping container 1 and which contains respiring biological material surrounded by a packaging atmosphere, 2 respiring biological material 2, which is surrounded by a packaging atmosphere, which may be one or more of the number of biological materials and which may be packed in a number of different ways, 32 a first ACM 32 having a surface area of at least 0.65 m$^2$ and an R ratio of at least 3, 33 a second ACM 33 having an R ratio at least 3 units lower than the R ratio of the first ACM, 31 an assembly 31 having an inlet port 34 and an outlet port 35 so that gas can be passed through the assembly; in FIGS. 1, 2 and 5, the assembly contains both the first ACM 32 and the second ACM 33, and in FIGS. 3, 4 and 6, the assembly contains only the first ACM 32.

4 a sensor 4 which can sense the concentration of at least one gas in the packaging atmosphere surrounding a respiring biological material within the container and which can communicate with a pump 342, 5 a sensor 5 which can sense the concentration of at least one gas in the packaging atmosphere surrounding a respiring biological material within the container and which can communicate with a pump 542, 54 a chamber 54 which surrounds the assembly 31 and which has an inlet and an outlet so that an exterior atmosphere can be pumped through the assembly in contact with the second surface of the first ACM 32 and, when the assembly 31 contains the second ACM 33, in contact with both the second surface of the first ACM 32 and the second surface of the second ACM 33, 342 a pump 342 which draws packaging atmosphere from the container, which is connected by a conduit 341 to the assembly 31, and which causes the packaging atmosphere to circulate from the shipping container through the assembly 31, and to return the modified packaging atmosphere to the container through conduit 351; the pump 342 is optionally connected with the sensor 4 and contains a metering device such that the rate at which the packaging atmosphere flows through the assembly 31 depends on input from the sensor 4, 542 a pump 542 which is connected by a conduit 541 to the chamber 54 and which comprises a metering device which enables an exterior atmosphere to be pumped through the assembly 54 in contact with the second surface of the first ACM 32 and, when the assembly 31 also contains the second ACM 33, in contact with the second surface of the second ACM 33, at a rate which responds to input from the sensor 5, 55 a source of gas 55, the gas comprising, for example, oxygen-enriched air, a ripening agent or another atmosphere which when it is pumped through the assembly 54, interacts, through the ACM, with the packaging atmosphere passing through the assembly 31 to produce a desired result, 64 a chamber 64 to which access of the exterior atmosphere to the second ACM can be controlled by means of a pump 642, and

FIG. 1.

In FIG. 1, the pump 342 causes the packaging atmosphere in the container 1 to pass through the assembly 31 in contact with the first surfaces of the ACMs 32 and 33. The pump 542 causes ambient air (the exterior atmosphere) to flow through the assembly 54 and over the second surfaces of the ACMs 32 and 33 at a rate which responds to input from the sensor 5.

FIG. 2.

FIG. 2 is the same as FIG. 1 except for the addition of a gas source 55 from which the pump 542 can draw an exterior atmosphere which may be, for example, oxygen-enriched air, a ripening agent or another atmosphere which interacts, through the ACMs, with the packaging atmosphere to produce a desired result.

FIG. 3.

FIG. 3 is similar to FIG. 1 except that
(1) the second ACM 33 is not part of the assembly 31, but is placed in the container 1 so that it has a first surface which is in direct contact with the packaging atmosphere and a second surface which is not part of the exterior surface of the container, the second ACM optionally providing a controlled leak which helps to equalize pressure inside the container, and
(2) the assembly includes a sensor 4 which is connected to the pump 342 and whose output controls the rate at which the pump 542 causes the packaging atmosphere to flow through the assembly 31.

FIG. 4.

FIG. 4 is similar to FIG. 3 except that
(1) the sensor 4 is not present,
(2) the second ACM 33 is part of a chamber 64, and
(3) there is a pump 642 which causes an exterior atmosphere to flow through the chamber 64 in contact with the second surface of the second ACM 33.

FIG. 5.

FIG. 5 is similar to FIG. 1 except that the respiring biological material is within a sealed container 7 which has a capacity of at least 1 m$^3$ and which is within the shipping container 1.

FIG. 6.

FIG. 6 is similar to FIG. 3 except that the respiring biological material is within a sealed container 7 which has a capacity of at least 1 m$^3$ and which is within the shipping container 1.

This invention is useful for the storage of a wide variety of respiring biological materials, including for example asparagus, avocado, broccoli, cantaloupe melons, cherries, mangos and papayas. Suitable materials include the wide range of fruits which ripen (or undergo other changes, for example, in the case of citrus fruits, de-greening) when exposed to ethylene or another ripening agent, for example apples, apricots, avocados, bananas, blueberries, cherimoyas, dates, figs, kiwis, mangos, melons, peaches, papayas, pears, peppers, persimmons, and plums (all of which go through a climacteric when they ripen), as well as cherries, grapes, lemons, oranges, tomatoes and strawberries. Some aspects of the invention are especially useful for fruits which in commercial practice are ripened in ethylene-containing ripening rooms, for example avocados, bananas, Bartlett pears, kiwis, mangos, melons, peppers and tomatoes. The invention is particularly useful for the storage of bananas, because it makes it easier to control the development of the bananas (from the green state in which they are initially packed to the state in which they are sold at retail) in response to changes in respiration rate, shipping times and the demands of the retail marketplace.

The invention claimed is:

1. A method of controlling a packaging atmosphere within a sealed shipping container which is part of a container system which comprises
   (a) a shipping container which
      (i) can be loaded onto and transported by a ship or a truck, and
      (ii) has a capacity of at least 40 m³,
   (b) a respiring biological material which
      (i) is sealed within the shipping container, and
      (ii) is surrounded by a packaging atmosphere,
   (c) an assembly which
      (i) is outside but adjacent to the shipping container, and
      (ii) includes a first atmosphere control member (ACM) having a surface area of at least 0.65 m², an R ratio of at least 3, a first surface and a second surface, and
   (d) a second ACM which
      (i) is within the shipping container,
      (ii) has an R ratio which is at least 3 units lower than the R ratio of the first ACM,
      (iii) has a first surface which is in direct contact with the packaging atmosphere, and
      (iv) has a second surface which is not part of an exterior surface of the container and is in direct contact with an exterior atmosphere of the second ACM;
   the method comprising the steps of
   (A) causing an atmosphere to circulate from the shipping container, through the assembly in contact with the first surface of the first ACM, and back into the shipping container, the atmosphere when it first contacts the first surface of the first ACM consisting of the packaging atmosphere; and
   (B) causing an exterior atmosphere of the first ACM to contact the second surface of the first ACM and causing the exterior atmosphere of the first ACM to flow over the second surface of the first ACM.

2. A method according to claim 1 wherein the rate at which the exterior atmosphere of the first ACM flows over the second surface of the first ACM is controlled by reference to information received regarding the packaging atmosphere.

3. A method according to claim 1 wherein the exterior atmosphere of the first ACM is air or oxygen-enriched air.

4. A method according to claim 1 wherein the second ACM provides a controlled leak which helps to equalize pressure inside the container with pressure of a surrounding atmosphere.

5. A method according to claim 1 wherein the second ACM is part of a chamber to which access of the exterior atmosphere to the second ACM can be controlled, and the method includes causing the exterior atmosphere to the second ACM to flow through the chamber.

6. A method according to claim 1 wherein the rate at which the atmosphere flows through the assembly is controlled by reference to information received indicating the concentration of a gas in the packaging atmosphere.

7. A method according to claim 1 which comprises, before step (A), the step of connecting the shipping container to the assembly so that the atmosphere can be circulated from the shipping container, through the assembly and back into the shipping container, the connecting step being carried out while the shipping container is loaded onto a ship or a truck.

8. A method according to claim 1 which comprises, before step (A), the steps of
   unloading the shipping container from a ship or a truck, and
   after the unloading step, connecting the shipping container to the assembly so that the atmosphere can be circulated from the shipping container, through the assembly and back into the shipping container.

9. A method according to claim 1 wherein the assembly is attached to the shipping container and is not removed when the biologically respiring material is placed within, or removed from, the container.

10. A container system which comprises
    (a) a shipping container which
       (i) can be loaded onto and transported by a ship or a truck, and
       (ii) has a capacity of at least 40 m³,
    (b) a respiring biological material which
       (i) is sealed within the shipping container, and
       (ii) is surrounded by a packaging atmosphere, and
    (c) an assembly which
       (i) is outside but adjacent to the shipping container, and
       (ii) includes
          (1) a first atmosphere control member (ACM), which has a surface area of at least 0.65 m², an R ratio of at least 3, a first surface which is contacted by the packaging atmosphere and a second surface which is contacted by an exterior atmosphere of the first ACM, and
          (2) a second ACM which has an R ratio which is at least 3 units lower than the R ratio of the first ACM, a first surface which is contacted by the packaging atmosphere, and a second surface which is contacted by an exterior atmosphere of to the second ACM; and
    (d) conduits for circulating an atmosphere from the shipping container, through the assembly in contact with the first surface of the first ACM, and in contact with the first surface of the second ACM, and back into the shipping container, the atmosphere flowing over the first surface of the first ACM and the first surface of the second ACM simultaneously or sequentially, and the atmosphere when it first contacts either or both of the first surface of the first ACM and the first surface of the second ACM consisting of the packaging atmosphere;
    said container system being capable of measuring the concentration of at least one gas in the packaging atmosphere, and comprising one or more devices selected from the group consisting of compressors, pumps and valves for supplying the exterior atmosphere of the first ACM to the second surface of the first ACM at a rate which is responsive to input regarding the concentration of at least one gas in the packaging atmosphere.

11. A container system according to claim 10 which comprises one or more devices selected from the group consisting of compressors, pumps and valves for changing the rate at which a third atmosphere circulates through the assembly in response to input regarding the concentration of at least one gas in the packaging atmosphere.

12. A method according to claim 1 wherein the exterior atmosphere of the first ACM comprises a ripening agent for the respiring biological material and the ripening agent is introduced into the packaging atmosphere through the first ACM.

13. A method of controlling a packaging atmosphere within a sealed container which is part of a container system which comprises
    (a) a shipping container which
       (i) can be loaded onto and transported by a ship or a truck, and
       (ii) has a capacity of at least 40 m³, (b) a sealed container which has a capacity of at least 1 m³, which is within the shipping container and which contains a respiring biological material which is surrounded by a packaging atmosphere,
(c) an assembly which
  (i) is outside but adjacent to the sealed container, and
  (ii) includes a first atmosphere control member (ACM) having a surface area of at least 0.65 m², an R ratio of at least 3, a first surface and a second surface, and
(d) a second ACM which
  (i) is within the shipping container,
  (ii) has an R ratio which is at least 3 units lower than the R ratio of the first ACM,
  (iii) has a first surface which is in direct contact with the packaging atmosphere, and
  (iv) has a second surface which is not part of an exterior surface of the container and is in direct contact with an exterior atmosphere of the second ACM;
the method comprising the steps of
  (A) causing an atmosphere to circulate from the sealed container, through the assembly in contact with the first surface of the first ACM and back into the sealed container, the atmosphere when it first contacts the first surface of the first ACM consisting of the packaging atmosphere; and
  (B) causing an exterior atmosphere of the first ACM to contact the second surface of the first ACM and causing the exterior atmosphere of the first ACM to flow over the second surface of the first ACM.

14. A method according to claim 13 wherein the rate at which the exterior atmosphere of the first ACM flows over the second surface of the first ACM is controlled by reference to information received regarding the packaging atmosphere.

15. A method according to claim 13 wherein the second ACM provides a controlled leak which helps to equalize pressure inside the sealed container with pressure of a surrounding atmosphere.

16. A method according to claim 13 which comprises, before step (A), the step of connecting the sealed container to the assembly so that the atmosphere can be circulated from the sealed container through the assembly and back into the sealed container, the connecting step being carried out while the shipping container is loaded onto a ship or a truck.

17. A method according to claim 13 which comprises, before step (A), the steps of
  unloading the shipping container from a ship or a truck, and
  after the unloading step, connecting the sealed container to the assembly so that the atmosphere can be circulated from the sealed container through the assembly and back into the sealed container.

18. A container system which comprises
(a) a shipping container which
  (i) can be loaded onto and transported by a ship or a truck, and
  (ii) has a capacity of at least 40 m³,
(b) a sealed container which has a capacity of at least 1 m³, which is within the shipping container and which contains a respiring biological material which is surrounded by a packaging atmosphere, and
(c) an assembly which
  (i) is outside but adjacent to the sealed container, and
  (ii) includes
    (1) a first atmosphere control member (ACM), which has a surface area of at least 0.65 m², an R ratio of at least 3, a first surface which is contacted by the packaging atmosphere and a second surface which is contacted by an exterior atmosphere of the first ACM, and
    (2) a second ACM which has an R ratio which is at least 3 units lower than the R ratio of the first ACM, a first surface which is contacted by the packaging atmosphere, and a second surface which is contacted by an exterior atmosphere to the second ACM; and
(d) conduits for circulating an atmosphere from the sealed container, through the assembly in contact with the first surface of the first ACM, and in contact with the first surface of the second ACM, and back into the sealed container, the atmosphere flowing over the first surface of the first ACM and the first surface of the second ACM simultaneously or sequentially, and the atmosphere when it first contacts either or both of the first surface of the first ACM and the first surface of the second ACM consisting of the packaging atmosphere;
said container system being capable of measuring the concentration of at least one gas in the packaging atmosphere, and comprising one or more devices selected from the group consisting of compressors, pumps and valves for supplying the exterior atmosphere of the first ACM to the second surface of the first ACM at a rate which is responsive to input regarding the concentration of at least one gas in the packaging atmosphere.

19. A container system according to claim 18 which comprises one or more devices selected from the group consisting of compressors, pumps and valves for changing the rate at which a third atmosphere circulates through the assembly in response to the input regarding the concentration of at least one gas in the packaging atmosphere.

* * * * *